(12) United States Patent
Tabrizi

(10) Patent No.: US 6,404,184 B1
(45) Date of Patent: Jun. 11, 2002

(54) SIMPLIFIED LOW BACKLASH LVDT COUPLING

(76) Inventor: Sohail Tabrizi, c/o Kavlico Corporation, 14501 Los Angeles Ave., Moorpark, CA (US) 93021

(*) Notice: Subject to any disclaimer, the term of this patent is extended or adjusted under 35 U.S.C. 154(b) by 16 days.

(21) Appl. No.: 09/632,889

(22) Filed: Aug. 7, 2000

(51) Int. Cl.[7] .............................. G01B 7/30; G01B 7/14
(52) U.S. Cl. ........................... 324/207.18; 324/207.23; 324/207.25
(58) Field of Search ...................... 324/207.18, 207.19, 324/207.25, 207.23; 340/870.36; 318/657

(56) References Cited

U.S. PATENT DOCUMENTS

| | | | |
|---|---|---|---|
| 4,634,973 A | | 1/1987 | Murakami ................. 324/207 |
| 4,906,924 A | | 3/1990 | Zannis ................... 324/207.18 |
| 5,491,633 A | * | 2/1996 | Henry et la. ........... 364/424.05 |
| 6,299,139 B1 | * | 10/2001 | Kazerooni ................ 254/270 |

* cited by examiner

Primary Examiner—Edward Lefkowitz
Assistant Examiner—Reena Aurora
(74) Attorney, Agent, or Firm—Oppenheimer Wolff & Donnelly LLP

(57) ABSTRACT

An LVDT assembly measures movement of a linkage. The LVDT assembly includes multiple LVDT units mounted in parallel to an LVDT input member for concurrent operation. The LVDT assembly also includes a rotary head that has a threaded portion that is secured to the linkage by rotating the head and engaging mating threads on the linkage and on the rotary head. A conventional ball bearing assembly is provided between the rotary head and the stationary input member. A metallic ball is between the rotary head and the input member. A set screw engages the ball. Tightening the set screw stresses transmits a force from the set screw, the ball and the input member to stress the ball bearing. The stress substantially eliminates backlash between the rotary head and the LVDT input member.

11 Claims, 2 Drawing Sheets

SIMPLIFIED LOW BACKLASH LVDT COUPLING

BACKGROUND OF THE INVENTION

1. Field of the Invention

The present invention relates to linear variable differential transducer (LVDT) assemblies.

2. General Background and State of the Art

A linear variable differential transformer (LVDT) is a displacement transducer that produces an electrical signal proportional to the displacement of a moveable core (armature) within a cylindrical transformer. The transformer consists of a central, primary coil winding and two secondary coil windings on opposite ends of the primary winding. The coil windings are coaxial. The armature preferably is nickel-iron and is positioned within the coil assembly. The core provides a path for magnetic flux linking the primary coil to the secondary coils.

When the primary coil is energized with an alternating current, a cylindrical flux field is produced over the length of the armature. This flux field produces a voltage in each of the two secondary coils that varies as a function of the armature position. Armature movement moves the flux field into one secondary and out of the other causing an increase in the voltage induced in one secondary and a corresponding voltage decrease in the other. The secondary coils are normally connected in series with opposing phase. The net output of the LVDT is the difference between the two secondary voltages. When the armature is positioned symmetrically relative to the two secondary windings (the "null" position), the differential output is approximately zero, because the voltage of each secondary is equal but of opposite phase.

Subjecting an actuator to pressure or force can move an LVDT armature through a linkage. Thus, LVDTs are commonly used in actuators. As pressure increases, the armature moves toward one secondary winding and away from the other. This yields a voltage difference that can be proportional to the linear movement. Consequently, this voltage output can measure pressure and position.

Nearly all LVDTs that are designed for aircraft or missile applications are wound on an insulated stainless steel spool, magnetically shielded and enclosed in a stainless steel housing using welded construction. The armature is normally made from a 50% nickel-iron alloy and brazed to a stainless steel extension. Secondary leads are usually shielded to minimize channel-to-channel cross talk for multi-channel units and to shield components from RF energy.

The length and diameter of an LVDT must be sufficient to allow adequate winding space for achieving the desired electrical performance, support any pressure requirement and withstand the environmental shock, vibration and acceleration. Where physical size is limited, electrical performance must be flexible. Although the LVDT is basically a simple device, the operating characteristics and electrical parameters are complex and depend to a large extent on the physical limitations.

U.S. patent application Ser. No. 09/547,511, filed Apr. 12, 2000, discusses some of the parameters that designers consider when specifying the sizes of LVDT components. That discussion and the remainder of the application are incorporated by reference.

An LVDT's output voltage is proportional to the voltage applied to the primary. System accuracy depends on providing a constant input to the primary or compensating for variations of the input by using ratio techniques. The output can be taken as the differential voltage or, with a center tap, as two separate secondary voltages whose difference is a function of the displacement. If the sum of the secondary voltages is designed to be a specific ratio of the difference voltage, overall accuracy significantly improves.

LVDT assemblies are commonly used to provide an electrical output indicating the position of a moving part, such as a mechanical linkage on an airplane. Operating two or more LVDT units in parallel with their electrical outputs combined and averaged yields a more accurate indication of the position of the linkage.

In the initial installation or coupling of the LVDT assembly to the linkage, the input to the LVDT assembly may be an externally threaded rotary head. During assembly, the rotary head is threaded into a threaded hole in the linkage while the rest of the LVDT assembly remains stationary.

It is important that the rotary coupling between the input member and the remainder of the LVDT assembly have low backlash. Reduced backlash insures accurate indication of the position of the moving linkage despite back and forth movement of the linkage. Heretofore, the rotary coupling has used two conventional ball bearing assemblies oppositely stressed. The prior art also has used spring washers or thrust bearings to reduce the backlash.

INVENTION SUMMARY

The LVDT assembly of the present invention employs a single ball bearing assembly and a single metal ball to accomplish the same low backlash function with the same reliability as the more complex constructions of the prior art.

In accordance with a specific illustrative embodiment of the invention, an LVDT assembly includes multiple LVDT units mounted in parallel to an LVDT input member for concurrent operation. The LVDT assembly measures movement of a linkage. The LVDT assembly also includes a rotary head that has a threaded portion for securing to a linkage. The rotary head is secured to the linkage by rotating the head and engaging mating threads on the linkage and on the rotary head. A conventional ball bearing assembly is provided between the rotary head and the stationary input member. A metallic ball is between the rotary head and the input member. A set screw engages the ball. Tightening the set screw stresses the ball bearing. The stress substantially eliminates backlash between the rotary head and the LVDT input member.

In accordance with a further aspect of the invention, the rotary head may have another type of linkage engaging portion such as a rotary quick latch; and force may be applied to the ball by a tapered wedging action mechanism, instead of the set screw.

Other objects, features and advantages of the invention will become apparent from a consideration of the following detailed description, and the accompanying drawings.

DETAILED DESCRIPTION OF THE PREFERRED EMBODIMENTS

Figure 1:
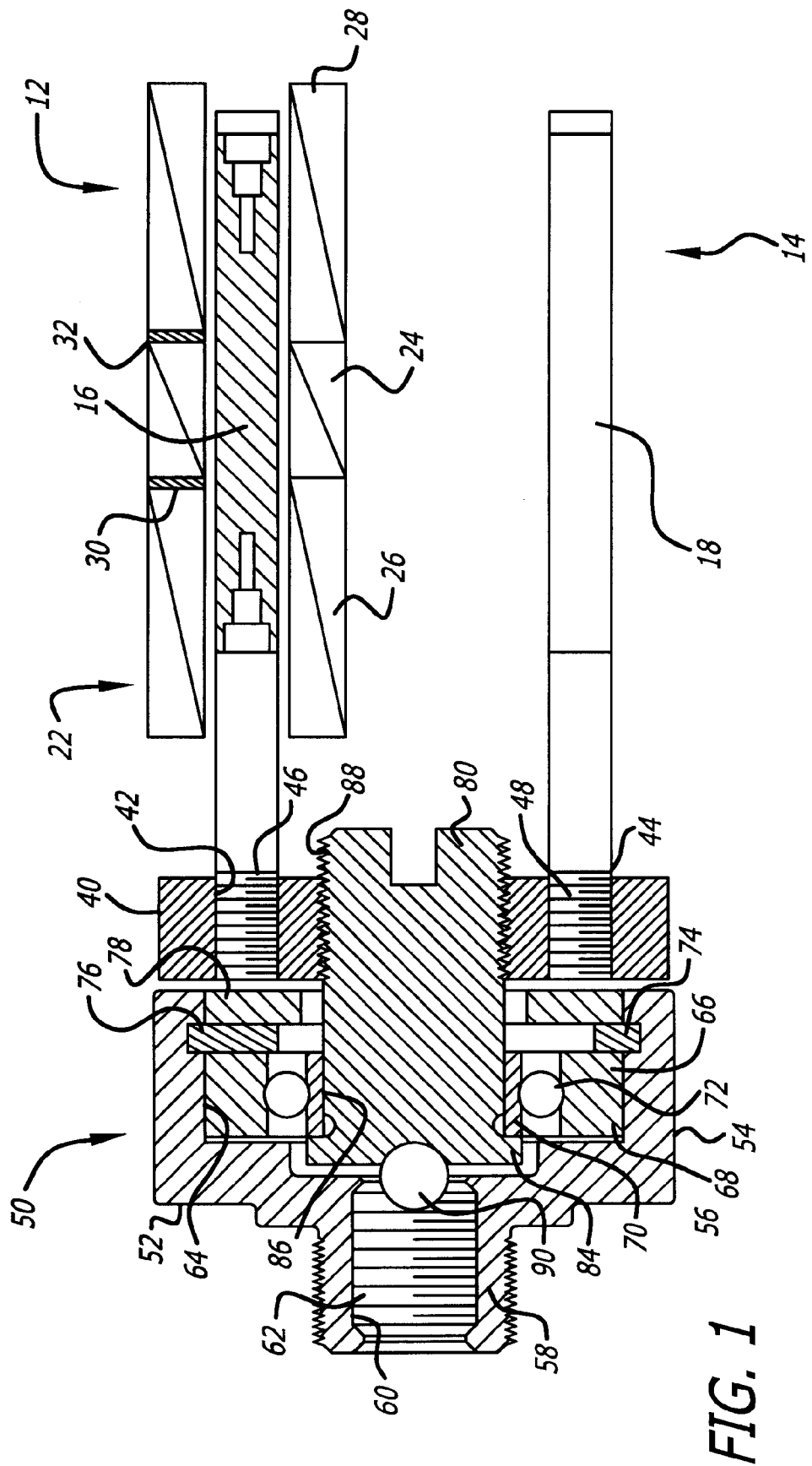
FIG. 1 is a sectional view of an exemplary embodiment of the LVDT system of the present invention.
Figure 2:
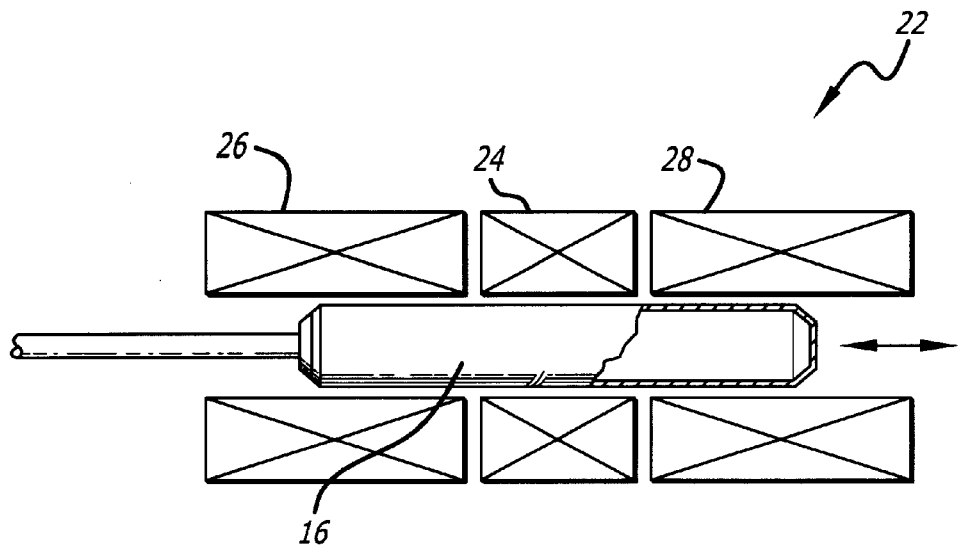
FIG. 2 is a schematic view of the armature and coil assembly of an exemplary embodiment of an LVDT.

The LVDT system of the present invention comprises multiple LVDT units. The exemplary embodiment of FIG. 1 shows two LVDT units, 12 and 14. These units mount within a housing (not shown). Each LVDT unit comprises an armature 16 and 18. The armatures are made from preferably iron or a nickel-iron alloy. The armatures 16 and 18 move within coil assemblies. FIG. 1 shows only one coil assembly 22, but armature 18 also has a coil assembly surrounding it. The coil assemblies 22 comprise a center, primary coil 24 and first and second secondary coils 26 and 28. As FIGS. 1 and 2 show, the coil assembly surrounds the armature 16. The coils may be slightly spaced apart, as FIG. 2 shows, or insulated washers 30 and 32 may separate the primary coil from the secondary coils. Although not shown in detail in the drawings, the coils are mounted within the housing to remain stationary while the armatures 16 and 18 move longitudinally with respect to the coil assemblies. The armatures 16 and 18 are attached to extensions A and B made from impermeable stainless steel.

The armatures 16 and 18, through extensions A and B, are attached to a fitting that is part of an LVDT mechanical input member. In the exemplary embodiment, fitting 40 (FIG. 1) is movable. It has threaded openings 42 and 44, which each receive a threaded end 46 and 48 of the respective extensions A and B. Two openings are provided in the exemplary embodiment, but additional threaded openings can be provided for added armatures.

The fitting 40 attaches to a rotary head 50. The rotary head is the part that attaches to a linkage. It is the linkage whose position is sensed by the LVDT. The rotary head 50 comprises an outer housing 52. The housing comprises a side wall 54 and a stepped back wall 56. The back wall also has an integral, rear-facing threaded nipple 58 with an internal threaded bore 60. The bore receives a set screw 62 (FIG. 1).

The other side of the rotary head 50 is opened to form an open area 64. The open area receives a ball bearing assembly 66. The bearing assembly comprises an outer channel 68, an inner channel 70 and ball bearings 72 between the two channels. Ring 74 in groove 76 secures the outer channel 66 of the bearing assembly, and an end cap 78 closes the open end 64 of the rotary head.

Threaded member 80 extends out of the open end 64 of the rotary head. As FIG. 1 shows, the threaded member is within and in contact with the inner channel 70 of the bearing assembly. The threaded member also has an integral, annular ring 84 that forms a shoulder 86 that is in contact with the inner bearing support 70. Support 40 for the armatures 16 and 18 screws onto the threaded end 88 of the threaded member. The threads are used only during assembly or during the initial nulling of the LVDT units. During operation, support 40 remains fixed to threaded member 80. Thus, threaded member 80 and support 40 form an input for the LVDT. Though the exemplary embodiment uses a threaded connection between the armature support and the threaded member, the two parts could be connected in many different ways. Moreover, the threaded member 80 and the support 40 could be a single machined part to form the LVDT input member.

To attach a linkage to the rotary head 50, one screws the threaded nipple 58 into mating threads of the linkage. Thus, the nipple is a linkage engaging portion for coupling to a linkage. The linkage does not rotate, and the LVDT units are fixed in angular positions. Accordingly, the rotary head permits threading of the nipple 58 onto mating threads of the linkage (not shown).

As the linkage moves relative to the rotary head, and backlash tends to cause inaccurate measurements. To reduce the backlash, a free member mounts between the rotary head 50 and the LVDT input member. In the exemplary embodiment, the free member comprises a ball 90, which mounts between the set screw 62 and the threaded member 80. The exemplary embodiment uses a ball because it allows generally free rotation between the set screw, which is fixed to the rotary head, and the threaded member, which is fixed with respect to the LVDT armatures.

Advancing the set screw 62 applies additional force on the threaded member 80. As a result, the shoulder 86 on the ring 84 pushes on the inner bearing track 70. This has the effect of tightening the system by stressing the ball bearing 66 and decreasing backlash. Withdrawing the set screw 62 has the opposite effect of loosening the system. Though the exemplary embodiment uses a set screw, other movable members in the rotating head can substitute for the set screw.

Figure 3:
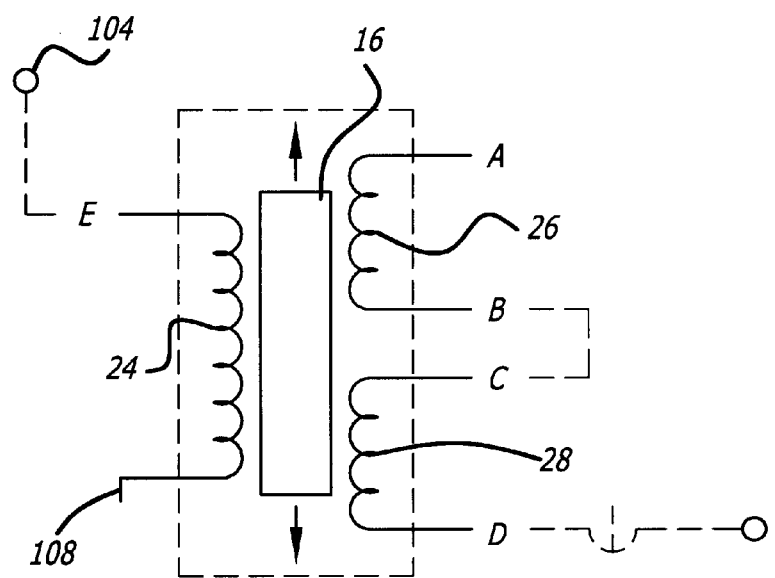
FIG. 3 is a circuit diagram of an LVDT.

After the parts shown in FIG. 1 are assembled, the nipple 58 is attached to the linkage. Alternating current is applied between terminals 104 and 106 (FIG. 3). Applicant recommends an alternating current at 1,800 to 3,500 Hz for good performance based on typical armature lengths. The flow of alternating current through primary winding 24 generates magnetic flux, which is coupled to secondary windings 26 and 28 through armature 16 (FIG. 3). The magnetic flux produces a voltage in each secondary winding. The two secondary windings normally have opposing phases. When the armature moves longitudinally (vertically in FIG. 3), it increases the voltage in one of the secondary windings and causes a corresponding voltage decrease in the other secondary winding. The voltage between points A and B over secondary winding 26 is compared to the voltage between points C and D over secondary winding 28. The difference between the two secondary voltages is the net output of the LVDT.

While the specification describes particular embodiments of the present invention, those of ordinary skill can devise variations of the present invention without departing from the inventive concept.

I claim:

1. A simplified low backlash LVDT assembly comprising:
   a plurality of LVDT units mounted in parallel to an LVDT input member,
   a rotary head having a threaded portion for coupling to a linkage, the position of which is to be sensed;
   a ball bearing assembly rotatably interconnecting the rotary head and the LVDT input member;
   a ball mounted between the rotary head and the LVDT input member; and
   a set screw engaging the ball for applying pressure between the rotary head and the LVDT input member, for stressing the ball bearing assembly and substantially eliminating backlash between the rotary head and the LVDT input member.

2. The LVDT assembly of claim 1, wherein the ball bearing assembly comprises a pair of tracks with a plurality of balls between the tracks, the LVDT input member having a surface in contact with one of the tracks of the ball bearing assembly.

3. A simplified low backlash LVDT assembly comprising:
   a plurality of LVDT units mounted in parallel to an LVDT input member,
   a rotary head having a linkage engaging portion for coupling to a linkage, the position of which is to be sensed;
   a ball bearing assembly rotatably interconnecting the rotary head and the LVDT input member;

a free member mounted between the rotary head and the LVDT input member; and a force applying member for engaging the free member and applying pressure between the rotary head and the LVDT input member, for stressing the ball bearing assembly and substantially eliminating backlash between the rotary head and the LVDT input member.

4. The LVDT assembly of claim 3, wherein the free member is a ball.

5. The LVDT assembly of claim 3, wherein the force applying member is a set screw mounted in the rotary head and in contact with the free member.

6. The LVDT assembly of claim 3, wherein the ball bearing assembly comprises a pair of tracks with a plurality of balls between the tracks, the LVDT input member having a surface in contact with one of the track of the ball bearing assembly.

7. The LVDT assembly of claim 6, wherein the free member is a ball.

8. The LVDT assembly of claim 6, wherein the force applying member is a set screw mounted in the rotary head and in contact with the free member.

9. A coupling for an LVDT assembly in which an armature moves relative to a coil assembly, the coupling comprising:
   a) a rotary head having a portion for securing to a linkage, the position of which is to be sensed;
   b) an input member attached to the armature of the LVDT;
   c) a bearing on the rotary head to permit rotation of the head relative to the input member, the input member contacting the bearing; and
   d) a moveable member on the rotary head and a free member between and in contact with the input member, whereby movement of the moveable member adjusts the force applied by the free member on the input member which adjusts the force from the input member on part of the bearing.

10. The coupling of claim 9 wherein the free member is a ball.

11. A method of decreasing backlash in an LVDT system comprising:
   a) mounting a plurality of armatures within a corresponding plurality of coil assemblies, the armatures being attached to an input member;
   b) mounting a rotary head to the input member; the rotary head having a bearing to permit rotation of the rotary head relative to the input member;
   c) providing a single ball between the rotary head and the input member;
   d) applying a force on the single ball to apply a force on the input member, the input member applying force to a portion of the bearing.

* * * * *